(12) United States Patent
Meacham

(10) Patent No.: US 7,226,687 B2
(45) Date of Patent: Jun. 5, 2007

(54) FUEL CELL ASSEMBLIES USING METALLIC BIPOLAR SEPARATORS

(76) Inventor: G. B. Kirby Meacham, 18560 Parkland Dr., Shaker Heights, OH (US) 44122

( * ) Notice: Subject to any disclaimer, the term of this patent is extended or adjusted under 35 U.S.C. 154(b) by 567 days.

(21) Appl. No.: 10/841,613

(22) Filed: May 8, 2004

(65) Prior Publication Data

US 2005/0249996 A1    Nov. 10, 2005

(51) Int. Cl.
*H01M 8/10* (2006.01)
(52) U.S. Cl. .......................... 429/35; 429/34; 429/38; 429/39
(58) Field of Classification Search ............ None
See application file for complete search history.

(56) References Cited

U.S. PATENT DOCUMENTS 4,514,475 A * 4/1985 Mientek ............. 429/35
4,950,562 A   8/1990 Yoshida et al.
4,997,727 A   3/1991 Bossel
5,453,331 A   9/1995 Bloom et al.
5,595,833 A * 1/1997 Gardner et al. ............ 429/19
6,106,967 A   8/2000 Virkar et al.
6,271,158 B1  8/2001 Xue et al.
6,326,096 B1  12/2001 Virkar et al.
2002/0048699 A1 4/2002 Steele et al.

* cited by examiner

*Primary Examiner*—Susy Tsang-Foster
*Assistant Examiner*—Cynthia Lee
(74) *Attorney, Agent, or Firm*—Peter F. Corless; Steven M. Jensen; Edwards Angell Palmer & Dodge LLP

(57) ABSTRACT

High temperature solid oxide fuel cells (SOFC) and fuel cell stacks incorporating metallic bipolar separators with integral edge seals are provided. The electrochemical cells include reactant manifolds and flow passages, and may have either cathode or anode supported structures. The bipolar separators are thin metallic sheets that minimize thermal expansion stress in the electrochemical cells. The tubular bead edge seals are formed as an integral part of the bipolar separator by a low-cost sheet metal stamping process.

28 Claims, 11 Drawing Sheets

FUEL CELL ASSEMBLIES USING METALLIC BIPOLAR SEPARATORS

FIELD OF THE INVENTION

The present invention relates to planar high temperature fuel cells and cell stacks that incorporate flow conduits, barriers, and seals to separate and direct fuel and oxidant gases, and in particular, to ceramic fuel cells with flow conduit, barrier, and seal designs adaptable to low-cost manufacturing techniques, such as those used for fabricating metallic materials.

BACKGROUND OF THE INVENTION

Fuel cells are electrochemical systems that generate electrical current by chemically reacting a fuel gas on an anode electrode with an oxidant gas on a cathode electrode. Conventionally, the oxidant gas is oxygen or air, and in high temperature solid oxide fuel cells (SOFCs), operated at approximately 600° C. to 1000° C., the fuel gas is hydrogen or a mixture of hydrogen, carbon monoxide, and/or traces of hydrocarbons. The fuel gas may also contain non-fuel gases including nitrogen, water vapor and carbon dioxide. Yttria stabilized zirconia (YSZ) is typically used as a SOFC electrolyte because of its properties of heat resistance, high ionic conductivity, and low electronic conductivity. The YSZ electrolyte may be fabricated as a freestanding ceramic sheet or a ceramic coating on a substrate. A three-layer structure with a porous anode electrode on one side of the YSZ electrolyte and a porous cathode electrode on the other side of the YSZ electrolyte forms a complete electrochemical cell. A typical anode electrode is a cermet containing YSZ and nickel or copper, and a typical cathode electrode is lanthanum strontium manganite (LSM).

Each of the fuel cells described above produces a potential of less than about 1 volt, so multiple cells must be connected in series to produce a higher, more useful voltage. The series interconnection may be accomplished by constructing a bipolar stack of planar cells such that current flows from the anode of one cell to the cathode of the next cell. The stack output current is collected from the top and bottom cells at a voltage equal to the sum of the voltages of the individual cells. Fuel gas and oxidant gas must be supplied to each cell in the stack, while the fuel and oxidant gases are kept separate so that they only react with each other indirectly though the electrochemical fuel cell to generate electric current. Direct reaction of the fuel and oxidant gases can reduce energy conversion efficiency, and may generate high temperatures that damage the cell or stack structures. Barrier structures, seals, and flow conduits that separate the fuel gas from the oxidant gas are necessary elements in planar fuel cell stack assemblies.

U.S. Pat. No. 4,950,562 to Yoshida et al. relates to an exemplary prior art SOFC fuel cell stack assembly with external manifolds. The electrochemical cell is a thin rectangular structure including a solid electrolyte covered on one side by porous anode material and covered on the opposite side by porous cathode material. The cells are stacked together with rectangular bipolar separators that connect the anode of each cell in a stack to the cathode of an adjacent cell. Fuel gas flows through parallel grooves on the anode-contacting side that extend from a first edge of the rectangular bipolar separator to the opposite edge. Similarly, oxidant gas flows through parallel grooves on the cathode-contacting side that extend from a second edge of the rectangular bipolar separator to the opposite edge, such that the fuel and oxidant grooves are perpendicular to each other. Each of the four sides of the stack presents an array of openings for use as: fuel-in, fuel-out, oxidant-in, and oxidant-out. Corresponding fuel-in, fuel-out, oxidant-in, and oxidant-out manifold ducts cover the four cell stack sides and communicate with the arrays of openings. Current is collected from external terminals at the ends of the stack at a voltage equal to the total of the individual cell voltages. The bipolar separators and external terminals in Yoshida are coated with chromium-containing metal alloy that carries the current from one cell to the next cell, while resisting the effects of the fuel gas on the anode side and the oxidant gas on the cathode side at elevated operating temperatures. In addition, the alloy is selected to have thermal expansion characteristics compatible with the other components. Seals between the cells and the bipolar separators and external terminals are formed by glass paste. The four manifold ducts are formed by a ceramic tube slipped over the rectangular stack, with ceramic paste and glass paste seals between the stack corners and the inner diameter of the ceramic tube. In combination, these seals prevent mixing and direct reaction between the fuel gas and oxidant gas streams. However, external manifold cells have proven difficult in practice, in large part because of the difficulty sealing the manifolds to the cell stack. The seals must bridge irregularities in the stack edges, allow relative movements with temperature changes, and be electrically insulating to avoid shorting the cells. Due to at least these drawbacks associated with external manifolds, the use of internal manifolds is preferred.

U.S. Patent Application Publication 2002/0048699 to Steele et al. relates to an exemplary prior art SOFC cell stack assembly with internal manifolds. The electrochemical cell is formed as three layers on a porous chromium-containing stainless steel sheet that includes a non-porous border extending beyond the electrochemical cell. The first layer of the electrochemical cell is a porous cathode, followed by a dense electrolyte layer, and a porous anode layer. The cell is welded or brazed at the center of a rectangular metal bipolar separator that is larger than the cell, forming a cell module. Four apertures are formed through the bipolar separator in the border such that each aperture is positioned between an outer edge of the cell and an inner edge of the bipolar separator. Fuel gas flows through grooves on the anode-contacting side that extend from a first aperture in the bipolar separator to a second aperture near the opposite edge. Similarly, oxidant gas flows through grooves on the cathode-contacting side that extend from a third aperture in the bipolar separator to a fourth aperture near the opposite edge, such that the fuel and oxidant grooves are perpendicular to each other. The apertures align and form axial ducts when the cell modules are stacked, forming fuel-in, fuel-out, oxidant-in, and oxidant-out internal manifolds that communicate with the corresponding flow grooves. Current is collected from external terminals at the ends of the stack at a voltage equal to the total of the individual cell voltages. The bipolar separators in Steele are machined or stamped from chromium-containing metal alloy that carries the current from one cell to the next, while resisting the effects of the fuel gas on the anode side and the oxidant gas on the cathode side at elevated operating temperatures. In addition, the alloy is selected to have thermal expansion characteristics compatible with the other components. A compressible electrically insulating seal gasket is provided between the stacked cell modules. The gasket seals around the stack perimeter and between the fuel-in, fuel-out, oxidant-in, and oxidant-out internal manifolds to prevent mixing and direct reaction between the fuel gas and oxidant gas streams. Such a compliant seal is possible because of the maximum operating temperature of 500° C. of the particular electrochemical cell material system used in Steele.

Formation of fuel and oxidant gas flow grooves in metallic bipolar separators as described, e.g., in Yoshida and Steele requires the use of thick separators, but it would be cost-prohibitive to construct the separators from expensive materials such as noble metals. Further, such thick bipolar separators are rigid, and must have thermal expansion characteristics closely matched to those of the electrochemical cells to prevent excessive mechanical stress. The lack of compliance of the separators also requires use of a sealing means such as a compliant gasket or glass paste. As described above, the electrically insulating compliant gaskets used in Steele are limited to relatively low temperature systems.

While substitution of compliant metallic gaskets might raise the temperature limit to accommodate more typical SOFC material systems, the metallic gaskets would electrically short circuit the cells. Glass-based seal gaskets are described, e.g., in U.S. Pat. No. 5,453,331 to Bloom et al. and U.S. Pat. No. 6,271,158 to Xue et al. The glass and filler materials of the seal gaskets are selected such that the seal is somewhat viscous and compliant at the cell operating temperature, thereby adjusting to fill the gaps. However, the following drawbacks are apparent from this approach. The seals transition to elastic solids as the cell and stack assembly cools, which may generate significant stresses unless the solid glass is a good thermal expansion match with the cell and stack components. In addition, glass often wets the cell and stack materials, which can migrate from their original locations. Further, amorphous glass may crystallize at operating temperatures, changing its thermal and mechanical properties.

U.S. Pat. No. 4,997,727 to Bossel describes deep-drawn thin metal bipolar separators made of a chromium-containing superalloy. The separators have an egg carton-like shape that contacts and electrically connects adjacent electrochemical fuel cells while providing the required fuel and oxidant passages. The shape is also intended to provide a certain compressibility to maintain electrical contact. The electrochemical fuel cells include thick edges formed as an extension of the thinner active YSZ electrolyte sheet. These thick cell edges are shaped such that they interlock with the bipolar separators to form edge seals, eliminating the need for other sealing materials such as glass. This interlocking seal may prove difficult in practice since precise control of the planar dimensions of the bipolar separator and the electrochemical cell is required. Such dimensional control is particularly difficult for ceramic components such as the YSZ electrolyte that shrink during firing. The invention described in Bossel is configured for use with external manifolds, where internal manifold stacks are not disclosed.

U.S. Pat. Nos. 6,106,967 and 6,326,096, both to Virkar et al., describe electrochemical cells incorporating flow grooves, and a combined bipolar separator and sealing gasket made of flat metallic foil. The structural base of the electrochemical fuel cells is a die-formed, generally rectangular plate made of porous anode material. The fuel-contacting side has molded parallel fuel gas flow grooves that extend from a first edge of the rectangular bipolar separator to the opposite edge. The oxidant-contacting side has molded parallel oxidant gas flow grooves that extend from a second edge of the rectangular bipolar separator to the opposite edge, such that the fuel and oxidant grooves are perpendicular to each other. The oxidant-contacting side is coated with a thin, dense YSZ electrolyte film that is then coated with a thicker porous LSM cathode film. The thin metallic foil is compliant enough in compression to conform to the mating surfaces and provide a seal. Further, it is thin and malleable enough that it does not generate excessive stresses even with some mismatch in thermal expansion characteristics. The foil is specified as a superalloy containing chromium, with an optional nickel or copper coating on the fuel side to eliminate formation of an electrically resistive oxide film. The Virkar patents are designed for use with external manifolds, where internal manifold stacks are not disclosed. Further, anode edges are exposed to oxidant gas in the oxidant manifolds, and cathode edges are exposed to fuel gases in the fuel manifolds, which could lead to undesirable reactions between fuel gas and oxidant gas, as well as degradation of the electrodes. Similarly, nickel or copper on the fuel side of the bipolar separator may react with oxidant gas at the exposed edges in the oxidant manifolds.

In conclusion, the prior art does not describe SOFC cell stacks, particularly internal manifold stacks, that take into account technical and cost considerations in order to produce durable, economically competitive fuel cell power generation systems.

SUMMARY OF THE INVENTION

The present invention is directed to high temperature fuel cell stacks including electrochemical cells, bipolar separators, manifolds, and seals capable of being combined together in an integrated system with improved performance, durability, and cost, as compared to the prior art.

According to the present invention, a thin, generally planar metallic bipolar separator is manufactured with integral edge seals and internal manifold seals formed by curling the metal edges to produce a tubular bead. Curling is a conventional, low-cost metal stamping process widely used to produce smooth finished edges on food tins and similar thin-walled metal containers. The curled edges of the internal manifold seals have several functions. First, the curled edges form a compliant gasket seal when clamped between two adjacent electrochemical cells. Second, the curled edges have a beam stiffness to bridge flow grooves in one electrochemical cell while maintaining sealing pressure on an adjacent cell. Further, the curl direction may be selected such that the cut metal edges are exposed to only one of the fuel and oxidant gases, thereby facilitating use of layered or coated material. One application of curled edge seals is a bipolar separator with a substrate stable only in fuel gas and an oxidant-resistant coating on one side. In this example, the preferred curl direction exposes the cut metal edges to fuel gas.

Anode-supported electrochemical fuel cells according to the present invention can incorporate thin metallic bipolar separators with integral edge seals and internal manifold seals. The structural base of the electrochemical fuel cells is a die-formed plate, or structural core, made of porous anode cermet that includes internal manifold apertures disposed around a central active area. A fuel-contacting side of the core includes molded fuel gas flow grooves that extend from a first internal manifold aperture to a second internal manifold aperture such that the grooves are distributed over the central active area. The oxidant-contacting side of the core has molded oxidant gas flow grooves that extend from a third internal manifold aperture to a fourth internal manifold aperture such that the grooves are distributed over the central active area. A shallow recessed seal surface that accommodates the curled edges of the bipolar separator surrounds each manifold aperture. A similar shallow recessed seal surface can be formed near the outer cell perimeter. A thin, dense YSZ electrolyte film is applied to substantially the entire structural base, except the central active area on the fuel contacting side where anode material is exposed. A porous LSM cathode layer can then be applied over the YSZ electrolyte film of the central active area on the oxidant-contacting side. The cathode layer and the underlying electrolyte film follow the contours of the oxidant flow grooves, increasing the effective power generation area to about 1.5 to 2 times the central active area.

The electrochemical cells preferably are stacked with metallic bipolar separators between each pair of cells. Dimensions of the bipolar separators can be set to achieve good electrical contact and sealing with an applied axial stack clamping load. The planar areas of the bipolar separators are clamped in direct compression between the central active areas of adjacent cells, providing electrical contact and establishing the cell spacing. The curled edges of the bipolar separators that contact the shallow recessed seal surfaces are flattened to form a compliant seal and accommodate axial dimensional variations. The shallow recessed seal surfaces are wider than the curled edges to accommodate planar dimensional variations and thermal expansion motions. All cell surfaces contacted by the curled edge seals preferably are coated by YSZ electrolyte film. Since YSZ is an electronic insulator, the metallic bipolar plate does not electrically short circuit the cells. The YSZ electrolyte film coating also shields the cell surfaces within the manifold apertures and at the cell perimeter, and prevents unwanted gas diffusion and reactions.

According to an alternative embodiment of the present invention, cathode-supported electrochemical fuel cells are provided that incorporate the bipolar separators. The structural base of the electrochemical fuel cells is a die-formed plate made of porous LSM cathode material in the manner described above with respect to anode structural base. A thin, dense YSZ electrolyte film is applied to substantially the entire structural base, except the central active area on the oxidant contacting side where cathode material is exposed. A porous anode cermet layer is then applied over the YSZ electrolyte film of the central active area on the fuel-contacting side. The anode layer and the underlying electrolyte film follow the contours of the fuel flow grooves, increasing the effective power generation area to about 1.5 to 2 times the central active area. The cathode-supported electrochemical cells are stacked with metallic bipolar separators and sealed in the same manner as described for the anode-supported cells.

The invention may be implemented in various forms. The invention is adapted to internal manifold layouts and gas flow groove configurations in which the fuel and oxidant gases are in cross-flow, parallel-flow, or mixed-flow. The invention also can be adapted to stacks that utilize multiple fuel-in, fuel-out, oxidant-in, and oxidant-out internal manifolds, as well as multistage stacks with gas transfer manifolds connecting a first group of cells to a second group of cells. The bipolar separator may be formed from a variety of materials and material combinations including pure metals, alloys, cermets, and layered or coated sheets. Ductile coatings may be applied to the sheet stock prior to forming the seals, while brittle coatings may be applied afterwards. The thin sheet construction allows high-cost materials to be used economically, and the purely compressive loading in the active area permits use of materials that have relatively low-strength at the operating temperature. The thin sheet also minimizes the effects of any thermal expansion mismatch between the bipolar separator and the cells, since the metal is ductile, and yields to follow the expansion of the much thicker ceramic cell. Further, the compressibility and beam stiffness of the curled edge seals may be adjusted by inserting materials such as metal wires or refractory powder packing in the bead.

The present invention can provide at least the following benefits. First, it provides an integrated bipolar separator and seal component that may be formed using conventional, economical metalworking techniques from a variety of metallic materials. Second, it provides cathode or anode supported SOFC cells that form simple and robust fuel cell stacks in combination with the combined bipolar separator and seal component.

BRIEF DESCRIPTION OF THE DRAWINGS

The appended claims set forth those novel features which characterize the invention. However, the invention itself, as well as further objects and advantages thereof, will best be understood by reference to the following detailed description taken in conjunction with the accompanying drawings, where like reference characters identify like elements throughout the various figures, in which:

DETAILED DESCRIPTION OF THE INVENTION

The present invention relates to high temperature fuel cell stacks including electrochemical cells, bipolar separators, manifolds, and seals capable of being combined together in an integrated system. The invention can be described with respect to high temperature solid oxide fuel cells (SOFC) and cell stacks operating with air and hydrogen-containing fuel gas and using internal manifolds. More particularly, the invention can be configured for use with SOFC electrochemical cells having Yttria stabilized zirconia (YSZ) electrolytes, anode electrodes of cermet containing YSZ and nickel or copper, and cathodes of lanthanum strontium manganite (LSM). However, it will be apparent to those skilled in the art that the following detailed description is similarly applicable to SOFC systems with different materials or other high temperature electrochemical systems such as electrically driven oxygen concentration systems.

Figure 1:
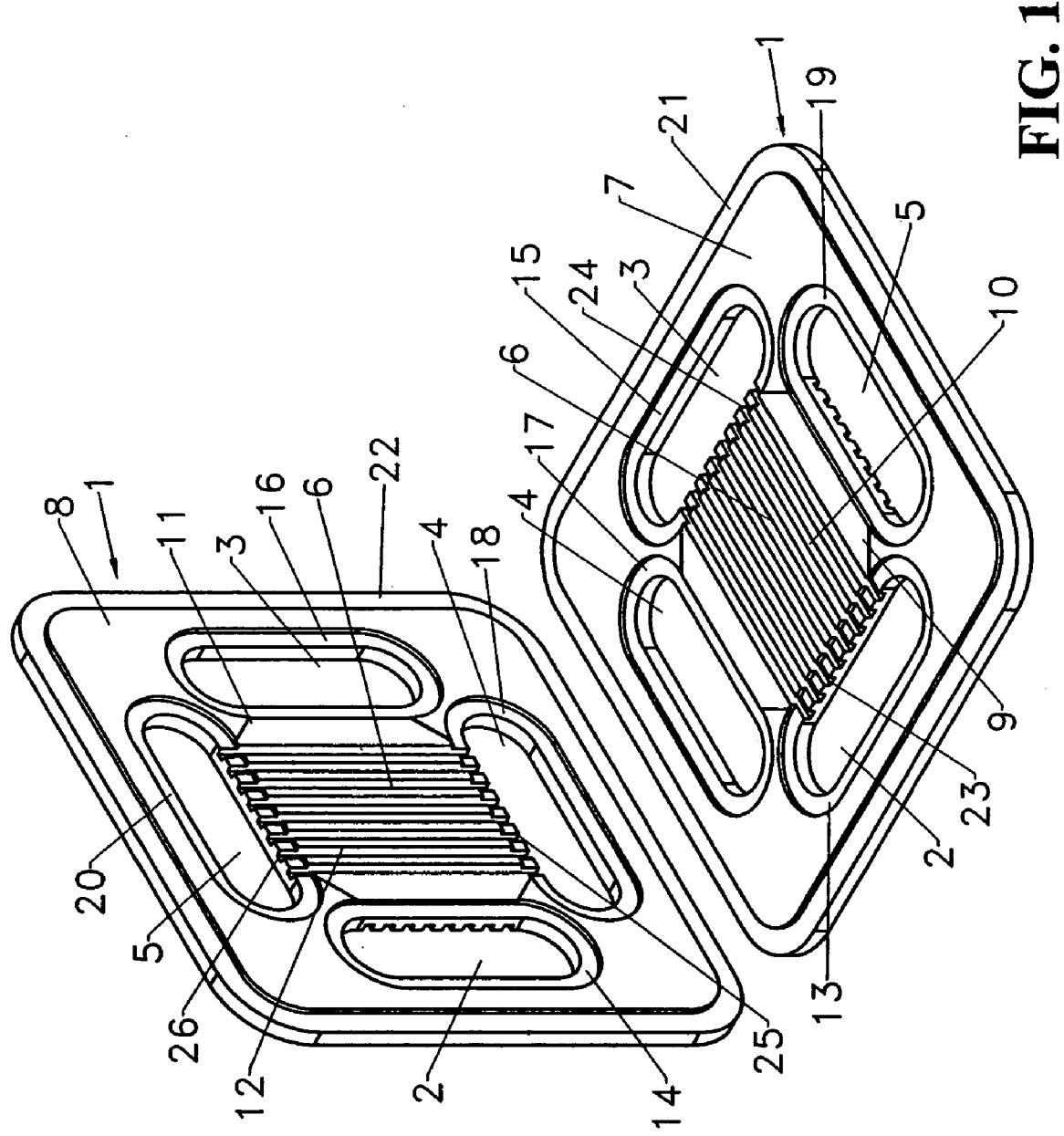
FIG. 1 is a perspective view showing two sides of the structural core of a planar SOFC anode-supported electrochemical cell according to the present invention.

FIG. 1 illustrates two sides of a structural core 1 of a cross-flow internal manifold configuration planar SOFC anode-supported electrochemical cell, according to the present invention. The structural core 1 can be formed as a plate, or is generally plate-like in shape, and preferably is made of porous anode cermet. The structural core 1 can be penetrated by a fuel-in manifold aperture 2, a fuel-out manifold aperture 3, an oxidant-in manifold aperture 4, and an oxidant-out manifold aperture 5 disposed around a central active area 6. The structural core 1 includes a fuel-contacting side 7 that develops a negative electrical potential, and an oxidant-contacting side 8 that develops a positive electrical potential. The structural core 1 incorporates a raised plateau 9 on the fuel-contacting side 7 of the central active area 6. The fuel-contacting side incorporates fuel gas flow grooves 10 that extend across the central active area 6 such that the grooves 10 preferably are distributed over the central active area 6.

The structural core 1 also incorporates a recess 11 on the oxidant-contacting side 8 of the central active area 6. The oxidant-contacting side 8 incorporates oxidant gas flow grooves 12 that extend across the central active area 6 such that the grooves 12 preferably are distributed over the central active area 6. Seal seats 13 and 14 surround the fuel-in manifold aperture 2 on the fuel-contacting side 7 and the oxidant-contacting side 8, respectively. Likewise, seal seats 15 and 16 surround the fuel-out manifold aperture 3; seal seats 17 and 18 surround the oxidant-in manifold aperture 4; and seal seats 19 and 20 surround the oxidant-out manifold aperture 5. Seal seats 21 and 22 parallel the perimeter of the core 1 on the fuel-contacting side 7 and the oxidant-contacting side 8, respectively. Fuel feed grooves 23 cross the seal seat 13 and connect the fuel gas flow grooves 10 to the fuel-in manifold aperture 2. Similarly, fuel exit grooves 24 cross the seal seat 15 and connect the fuel gas flow grooves 10 to the fuel-out manifold aperture 3. Moreover, oxidant feed grooves 25 cross the seal seat 18 and connect the oxidant gas flow grooves 12 to the oxidant-in manifold aperture 3; and oxidant exit grooves 26 cross the seal seat 20 and connect the oxidant gas flow grooves 12 to the oxidant-out manifold aperture 5.

Figure 2:
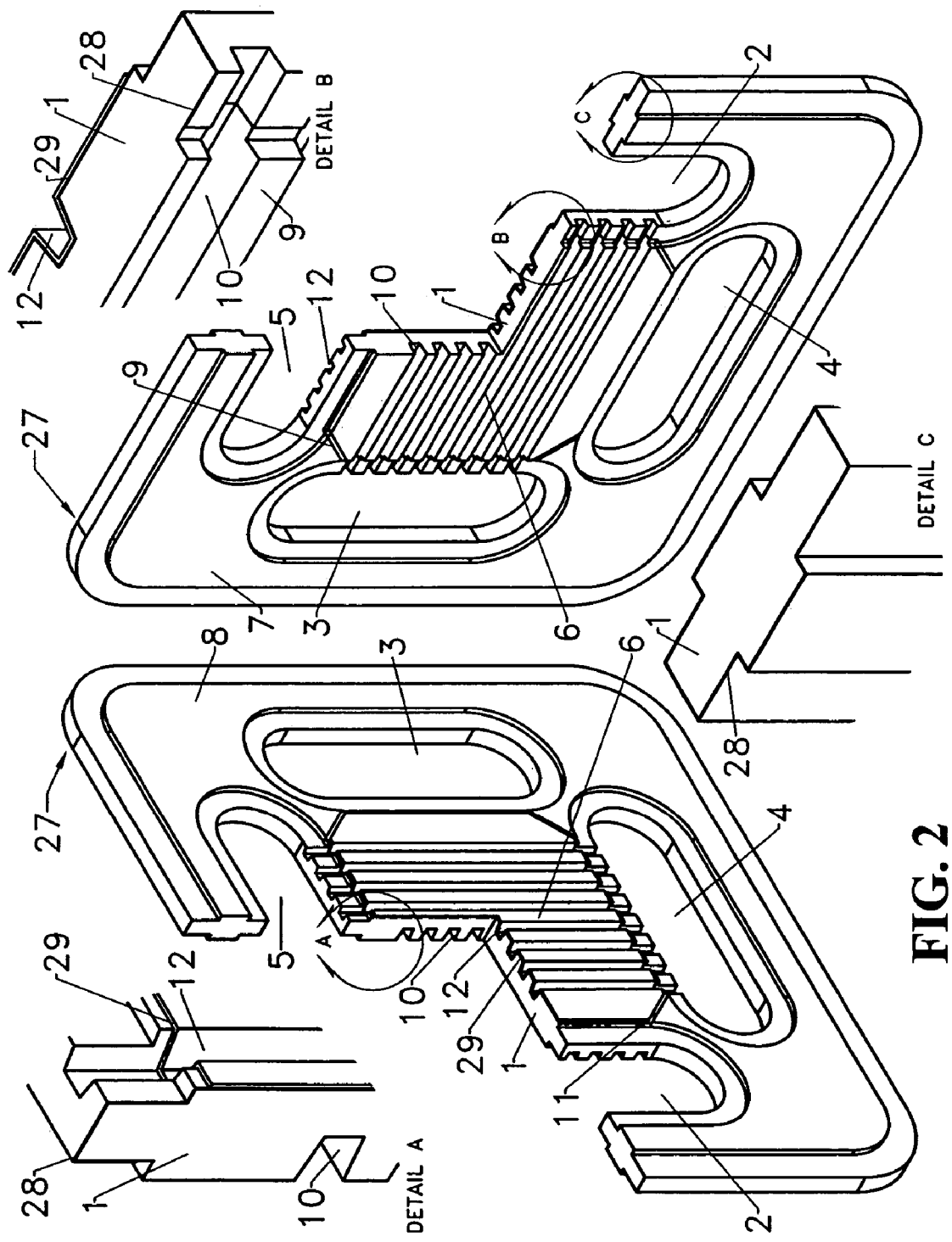
FIG. 2 is an enlarged perspective view of the electrochemical cell of FIG. 1.

An anode-supported electrochemical cell 27 according to the present invention is formed by applying one or more coatings to the structural core 1, as illustrated in FIG. 2. A thin, dense YSZ electrolyte film 28 preferably is applied to substantially all surfaces of the structural core 1, except the top surface of the raised plateau 9 on the fuel contacting side 7. Dimensions of the YSZ electrolyte film 28 can be set such that raised plateau rises above the surrounding electrolyte film. A porous LSM cathode layer 29 is then applied over the YSZ electrolyte film 28 within the recess 11 on the oxidant-contacting side 8. Dimensions of the porous LSM cathode layer 29 can be set such that the cathode layer 29 is substantially coplanar with the surrounding electrolyte film. The cathode layer 29 and the underlying electrolyte film 28 follow the contours of the oxidant flow grooves 12, thereby increasing the effective power generation area in the electrochemical cell 27 to about 1.5 to 2 times the central active area 6.

Figure 3:
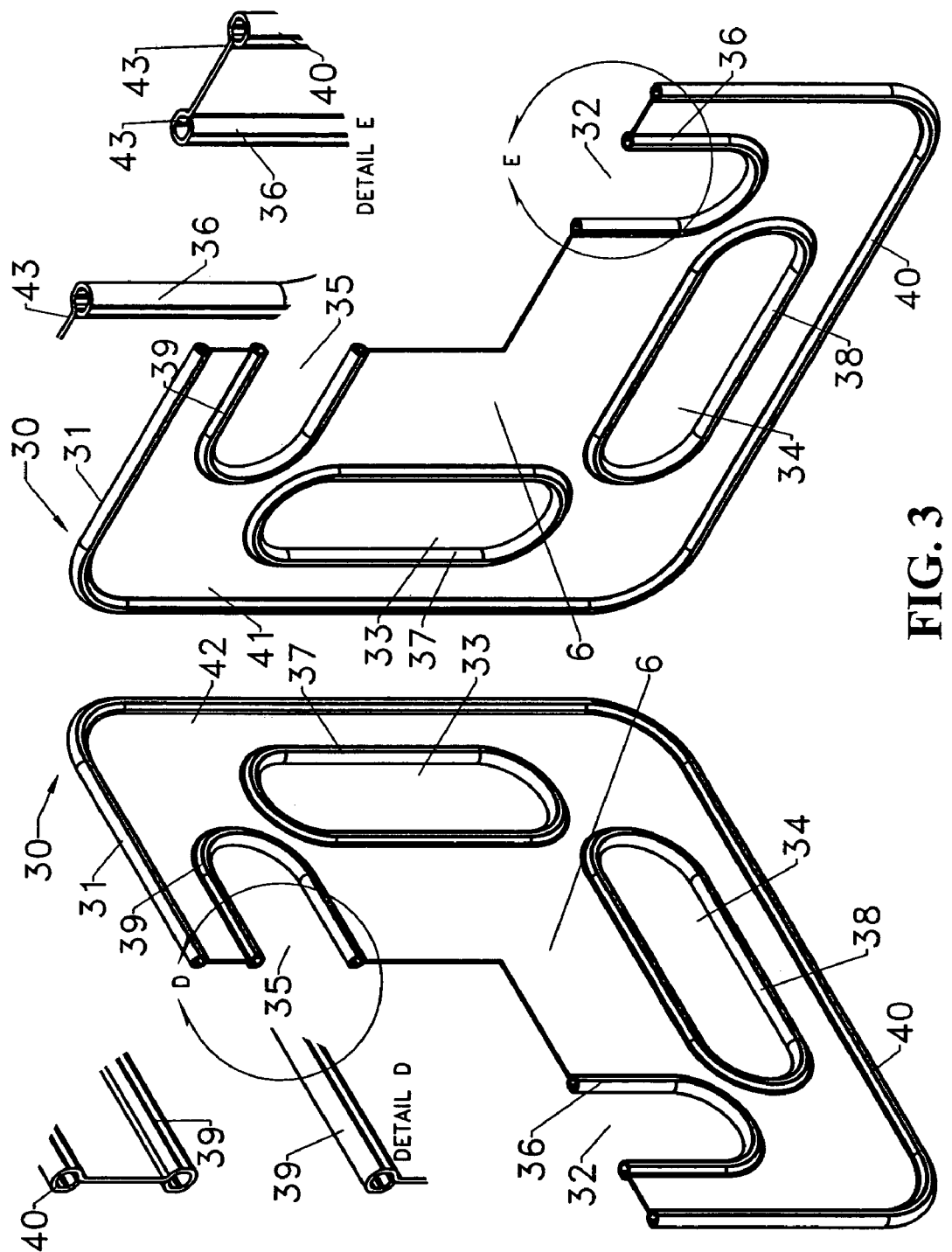
FIG. 3 is a perspective view of a metallic bipolar separator with curled edge seals useful with the electrochemical cell of FIG. 2.

FIG. 3 illustrates a metallic bipolar separator 30 with curled edge seals useful with the electrochemical cell of FIG. 2. The bipolar separator 30 is a generally planar metallic sheet, optionally composed of layered or coated material having a fuel gas-resistant side 41 and an oxidant gas-resistant side 42, where the surfaces of the bipolar separator 30 remain electronically conductive in SOFC operating conditions. The bipolar separator 30 includes a plurality of cut edges 43, which are resistant to either fuel or oxidant gas, but not necessarily resistant to both. As shown in FIG. 3, the bipolar separator 30 can be formed as a plate having a perimeter 31 that is penetrated by a plurality of apertures 32, 33, 34, and 35. The overall planar dimensions of the bipolar separator 30 are approximately the same as those of cell 27, and the apertures 32, 33, 34, and 35 have approximately the same planar dimensions and positions as the fuel-in aperture 2, the fuel-out aperture 3, the oxidant-in aperture 4, and the oxidant-out aperture 5, respectively. Integral compressive edge seals 36, 37, 38, 39, and 40 preferably are formed around the apertures 32, 33, 34, and 35 and the perimeter 3 1, respectively, by curling the metal edges.

Figure 4:
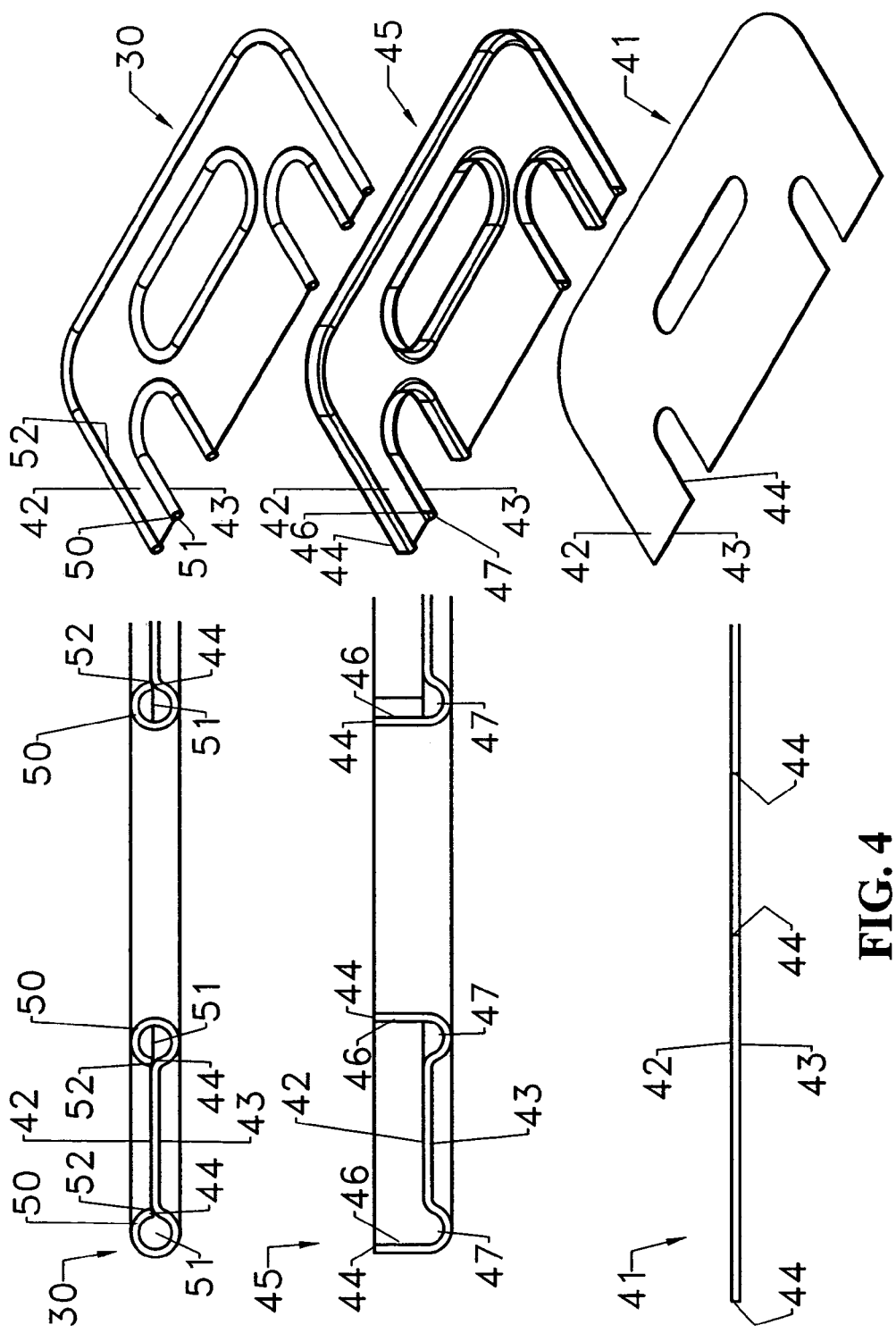
FIG. 4 is a perspective and cross-sectional view of the integral compressive edge seals of the electrochemical cell depicted in FIG. 3.

FIG. 4 illustrates details of the fabrication of the bipolar separator 30 of FIG. 3, and in particular, the construction of the integral compressive edge seals 36, 37, 38, 39, and 40 according to the present invention. The curled edges of the edge seals preferably are formed by using a conventional metal stamping process, such as a low-cost metal stamping process widely used to smooth and stiffen finished edges on food tins and similar thin-walled metal containers. As shown in FIG. 4, the bipolar separator 30 can be fabricated from a blanked planar sheet 41 made of ductile metal, the planar sheet 41 having a fuel gas-resistant side 42, an oxidant gas-resistant side 43, and cut edges 44. The cut edges 44 illustrated in FIG. 4 preferably are resistant to fuel gas. One or more drawing operations is used to produce an intermediate workpiece 45 that includes flanges 46 and embossed beads 47 such that the cut edges 44 face the same direction as fuel gas-resistant side 42 of the planar sheet. One or more press forming operations can be used to wrap the flanges 46 around to form tubes 50 with lumens 51 and open seams 52. The outside diameters of the tubes 50 form a continuous extension of the oxidant gas-resistant side 43, and the inside diameters form a continuous extension of the fuel gas-resistant side 42. The cut edges 44 are positioned adjacent to, and may abut, the fuel gas-resistant side 42. The tubes 50 can be formed in circular or non-circular shapes. The lumens 51 may be empty as shown, or may be partially or completely filled with wire, braze metal, refractory powder, refractory fiber, or other structures or materials to modify the compression or bending characteristics of the tubes 50. Further, the cut edges 44 may be bonded to the second face 41 to close the open seams 52.

Figure 5:
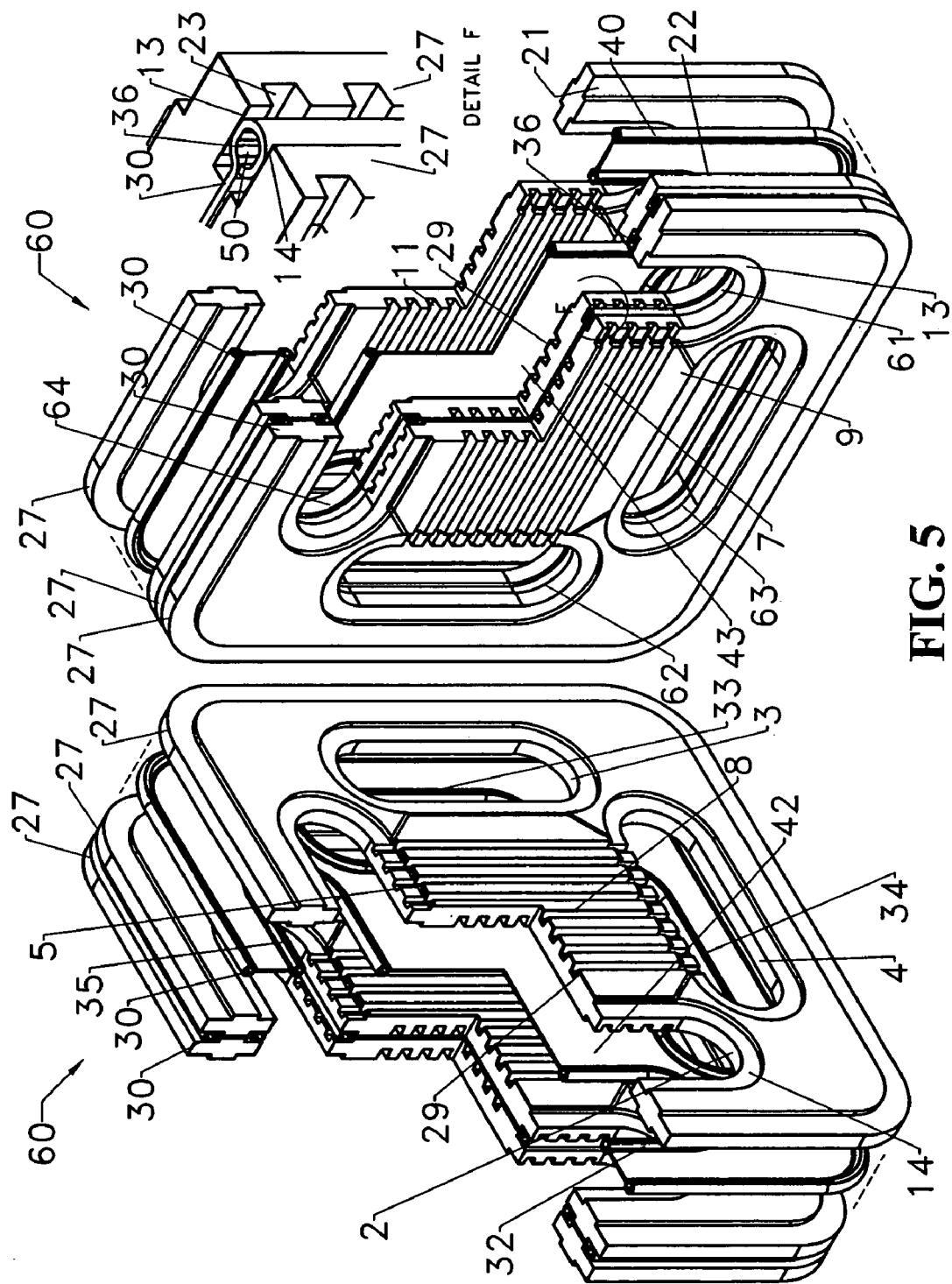
FIG. 5 is a perspective view of anode-supported bipolar cell assemblies according to the present invention.

FIG. 5 illustrates the construction of anode-supported bipolar cell assemblies 60 according to the present invention. A plurality of electrochemical cells 27 are alternately stacked with bipolar separators 30 such that the fuel-contacting sides 7 of the electrochemical cells 27 face the fuel-contacting faces 42 of the bipolar separators 30. Similarly, the oxidant-contacting sides 8 of the electrochemical cells 27 face the oxidant-contacting faces 43 of the bipolar separators 30. An axial clamping load applied perpendicular to the cell plane can press the electrochemical cells 27 and the bipolar separators 30 together such that the raised anode plateaus 9 of the cells, the bipolar separators 30, and the cathode layers 29 are in mechanical and electrical contact.

The bipolar cell assemblies 60 develop a voltage at the end cells equal to the sum of the voltages of each electrochemical cell 27. The fuel-contacting side 7 of one end cell is the negative terminal, and the oxidant-contacting side 8 of the opposite end cell is the positive terminal. The bipolar separator apertures 32, 33, 34, and 35 align with the manifold apertures 2, 3, 4, and 5 to form a fuel-in manifold 61, a fuel-out manifold 62, an oxidant-in manifold 63, and an oxidant-out manifold 64, respectively. The manifold seals are exemplified by the seals 36 formed around the fuel-in manifold 61. The edge seals 36 are clamped between the seal seats 13 on one cell and the seal seats 14 on an adjacent cell such that the edge seal tubes 50 are compressed to form gaskets. The edge seals 36 bridge over the fuel feed grooves 23 to provide flow passages into the fuel gas flow grooves 11. The beam stiffness of the edge seal tubes 50 maintains sealing contact with seal seats 14 on the adjacent cells while bridging the fuel feed grooves 23. Seal gaskets are formed around the fuel-out manifold 62, the oxidant-in manifold 63, and the oxidant-out manifold 64 in a similar manner. For example, the edge seals 40 are clamped between the seal seats 21 on one cell and the seal seats 22 on an adjacent cell such that the edge seals 40 are compressed to form gaskets around the cell perimeter.

The edge seals (e.g., edge seals 36) preferably are made of a metal that deforms plastically upon being compressed against the harder ceramic seal seats (e.g. seal seats 13 and 14), thereby providing complimentary, conformal sealing interfaces. Optionally, the sealing interface may be augmented as in the following examples. Glass or metal that melts and wets the edge seals and seal seats can fill any remaining gaps and provide hermetic seals. Soft solids, particularly minerals such as mica or metals, may be compressed between the edge seals and seal seats to fill gaps and improve sealing. The soft solids may be in the form of sheets or, particularly in the case of soft metals, coated onto the edge seals or seal seats. Other examples will be apparent to those skilled in the art.

Figure 6:
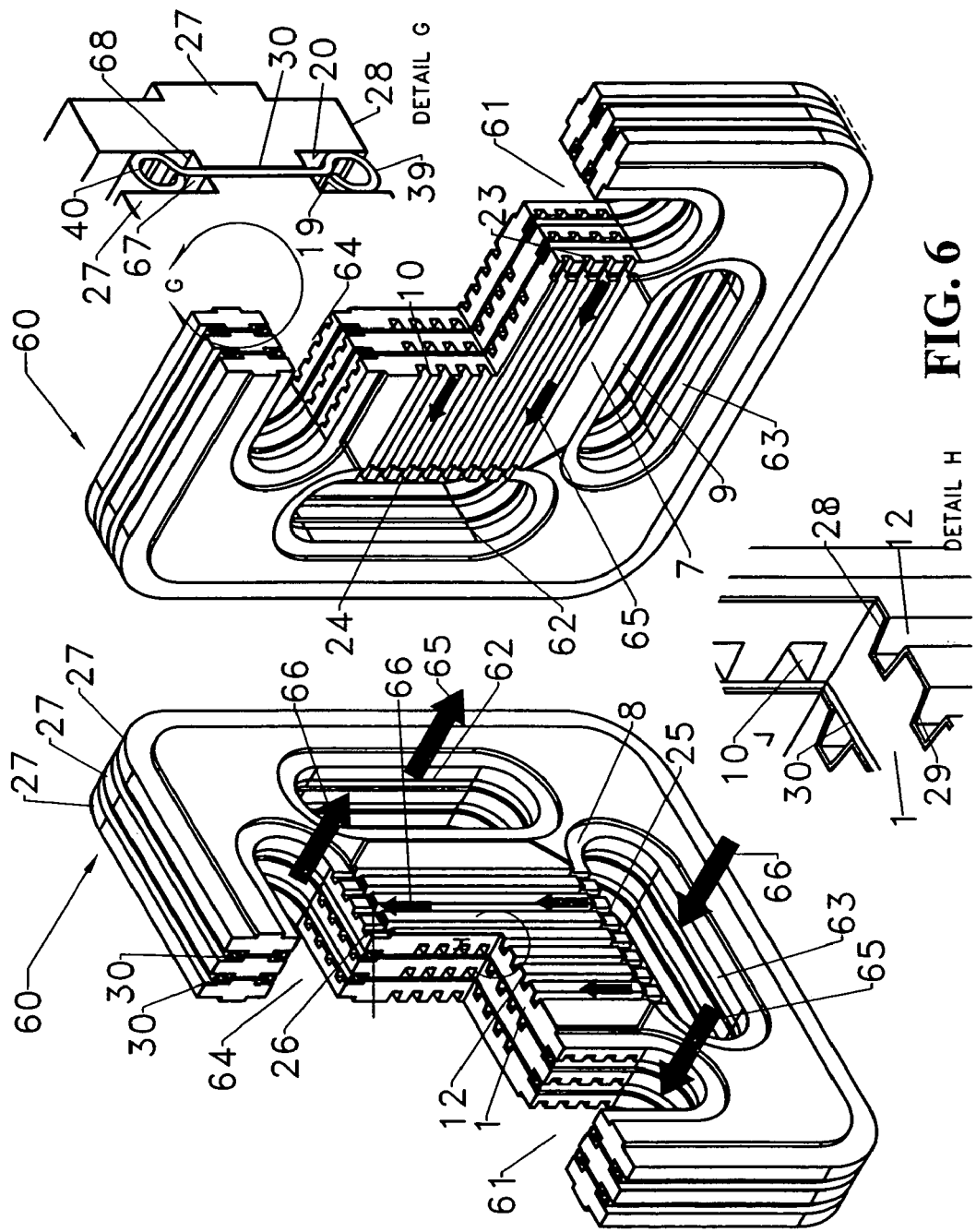
FIG. 6 is a perspective view of the bipolar cell assemblies of FIG. 5 with arrows depicting functions of the cell assemblies.

FIG. 6 is a functional diagram of the anode-supported bipolar cell assemblies 60. The fuel-in manifold 61 supplies fuel gas flow 65 (illustrated by arrows) through the fuel feed grooves 23 to the fuel flow grooves 10 in the fuel-contacting sides 7 of the cells, thereby distributing fuel gas over the anode where it reacts with oxidant ions transferred through the electrolyte film 28 to generate electric current. Similarly, the oxidant-in manifold 63 supplies oxidant gas flow 66 through the oxidant feed grooves 25 to the oxidant flow grooves 12 in the oxidant-contacting sides 8 of the cells, thereby distributing the required oxidant gas over the cathode layers 29. Spent fuel gas flows from the fuel flow grooves 10 through the fuel exit grooves 24 and into the fuel-out manifold 62. Spent oxidant flows from the oxidant flow grooves 12 through the oxidant exit grooves 26 and into the oxidant-out manifold 64.

While the fuel and oxidant gases primarily flow through the respective manifolds and the grooves crossing the active areas, the fuel and oxidant gases also contact other portions of the cells 27 and the bipolar separators 30. Fuel gas can flood narrow spaces 67 between the bipolar plates 30 and the fuel-contacting sides 7 of the cells 27 in areas outside the central active area 6. Similarly, oxidant gas can flood narrow spaces 68 between the oxidant gas-resistant sides 43 of the bipolar plates 30 and the oxidant-contacting sides 8 of the cells 27 in areas outside the central active area 6.

Further, outer edges of the cells 27 and the edge seals 40 of the bipolar separators 30 contact the ambient gas surrounding the bipolar cell assemblies 60. The ambient gas contacts the bipolar separator material face adapted to oxidant gas exposure. The YSZ electrolyte films 28 cover substantially all surfaces of the cells 27 except for the raised plateau areas 9, and serve as a gas barrier that separates the fuel gas-filled porous anode structural cores 1 from oxidant gas within the bipolar cell assemblies 60 or ambient gas surrounding the bipolar cell assemblies 60. Further, YSZ is known to be an electronic insulator, and thus prevents short circuit current flow through the seal seats (e.g., seal seats 19 and 20) and the edge seals (e.g., edge seals 39). Dimensions of the seal seats and edge seals can be set to achieve good electrical contact and sealing with an applied axial stack clamping load.

The central active areas 6 of the cells 27 and the bipolar separators 30 preferably are clamped in direct compression, providing electrical contact and establishing the cell spacing. The integral compressive edge seals 36, 37, 38, 39, and 40 of the bipolar separators can be flattened to form compliant seals and accommodate axial dimensional variations. Each compressive edge seal (e.g., edge seal 39) contacts two seal faces (e.g., seal seats 19 and 20). The seal faces/seal seats are wider than the edge seals to accommodate planar dimensional variations and thermal expansion motions. The thin metal sheet forming the bipolar separators 30 also minimizes the effects of any thermal expansion mismatch between the bipolar separators 30 and the cells 27. The metal preferably is ductile, and yields plastically to follow the expansion of the much thicker ceramic cells without causing failure of either the cells or the bipolar separators.

Figure 7:
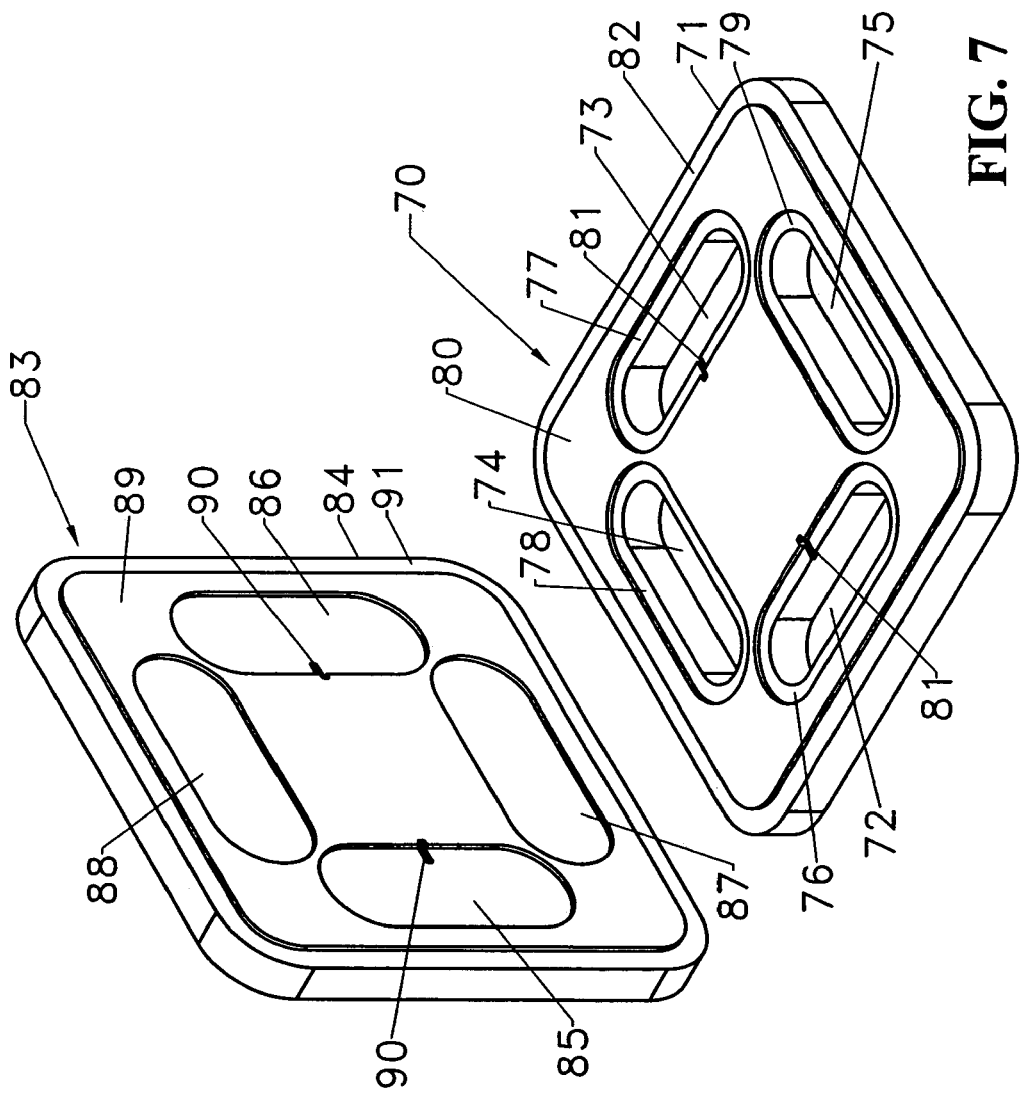
FIG. 7 is a perspective view of stack endplates useful with the bipolar cell assemblies of FIG. 5.

FIG. 7 illustrates a pair of stack endplates useful with the anode-supported bipolar cell assemblies 60 of FIGS. 5 and 6. A positive endplate 70 having a perimeter 71 is composed of heat-resistant conductive metal, and is penetrated by a fuel-in aperture 72, a fuel-out aperture 73, an oxidant-in aperture 74, and an oxidant-out aperture 75. The overall planar dimensions are approximately the same as those of the cell 27, and the apertures 72, 73, 74, and 75 have approximately the same planar dimensions and positions as the fuel-in manifold aperture 2, the fuel-out manifold aperture 3, the oxidant-in manifold aperture 4, and the oxidant-out manifold aperture 5, respectively. Seal seats 76, 77, 78, and 79 surround the apertures 72, 73, 74, and 75, respectively, on a stack-contacting side 80. One or more vent grooves 81 optionally can cross the seal seat 76 or 77. Seal seat 82 parallels the perimeter 71 of the positive endplate 70 on the stack-contacting side 80. A negative endplate 83 having a perimeter 84 is composed of heat-resistant conductive metal, and includes seal seats 85, 86, 87, and 88 on a stack-contacting side 89. Unlike positive endplate 70, the negative endplate 83 does not necessarily include apertures. The overall planar dimensions are approximately the same as those of the cell 27, and the seal seats 85, 86, 87, and 88 have approximately the same planar dimensions and positions as the seal seats 76, 77, 78 and 79, respectively, in the positive endplate 70. One or more vent grooves 90 optionally can cross the seal seat 85 or 86. Seal seat 91 parallels the perimeter 84 of the negative endplate 83 on the stack-contacting side 89.

Figure 8:
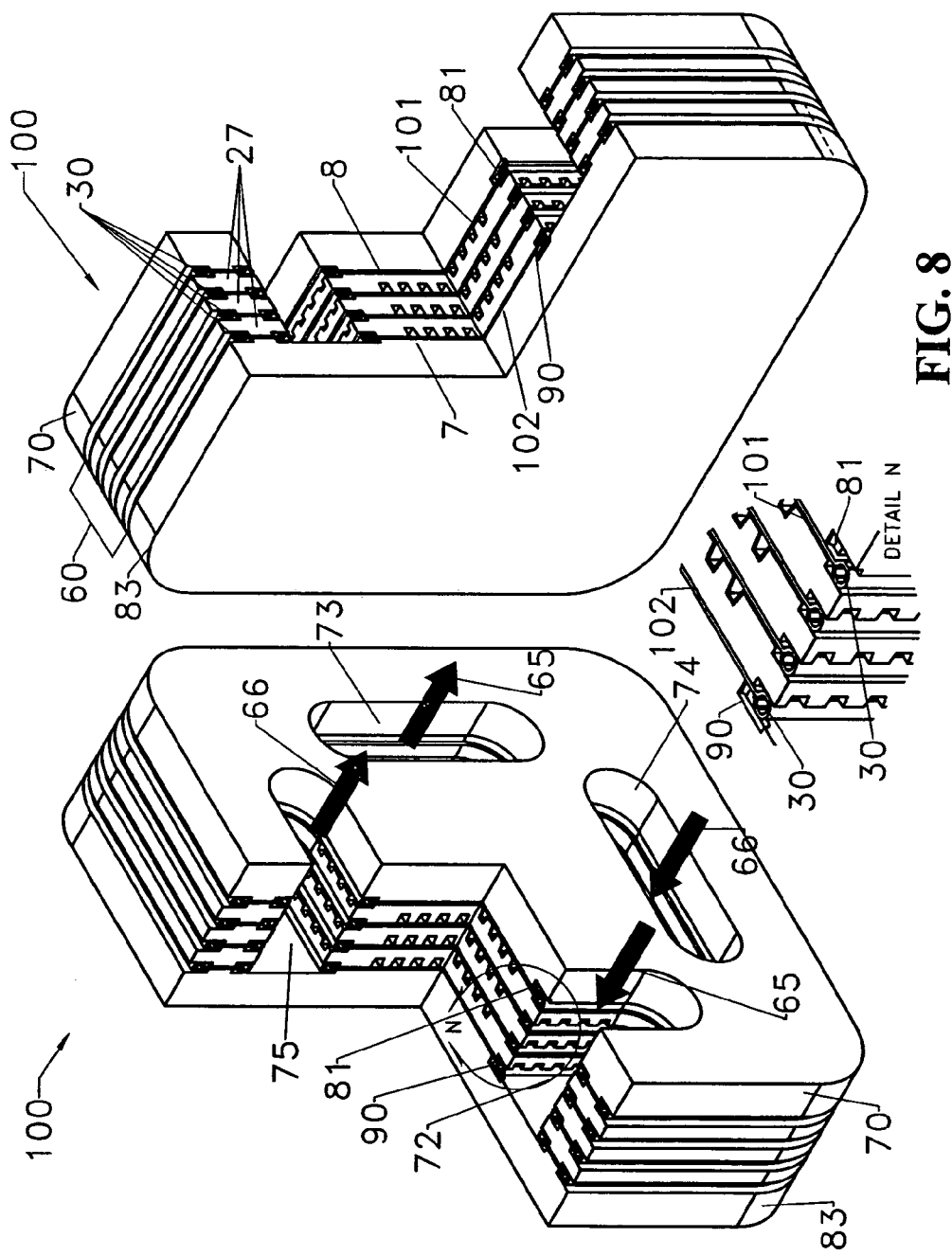
FIG. 8 is a perspective view of a bipolar cell stack according to the present invention.

FIG. 8 illustrates a bipolar cell stack 100 according to the present invention. A number N of cells 27 is alternately stacked with a number N+1 of bipolar separators 30, such that a bipolar cell assembly 60 is formed having a bipolar separator 30 on both ends. The bipolar cell assembly is clamped between a positive endplate 70 and a negative endplate 83, with the positive endplate 70 facing the oxidant-contacting sides 8 of the cells, and the positive endplate 83 facing the fuel-contacting sides 7. Ducts (not shown) connect with the apertures 72, 73, 74, and 75 that in turn align with and connect to the stack manifolds. Bipolar separators 30 on each end of the bipolar cell assembly 60 seal the connections between the positive endplate 70 and the negative endplate 83. Optional vent grooves 81 and 90, or bleed passages, can supply fuel gas to the interfaces 101 and 102 between the bipolar separators 30 on each end of the bipolar cell assembly 60 and the endplates 70 and 83 to reduce oxidation in the interfaces. Electric power is generated by the cells 27 when fuel and oxidant are supplied through the manifolds, and is collected by electrical connections (not shown) to the positive endplate 70 and the negative endplate 83.

Figure 9:
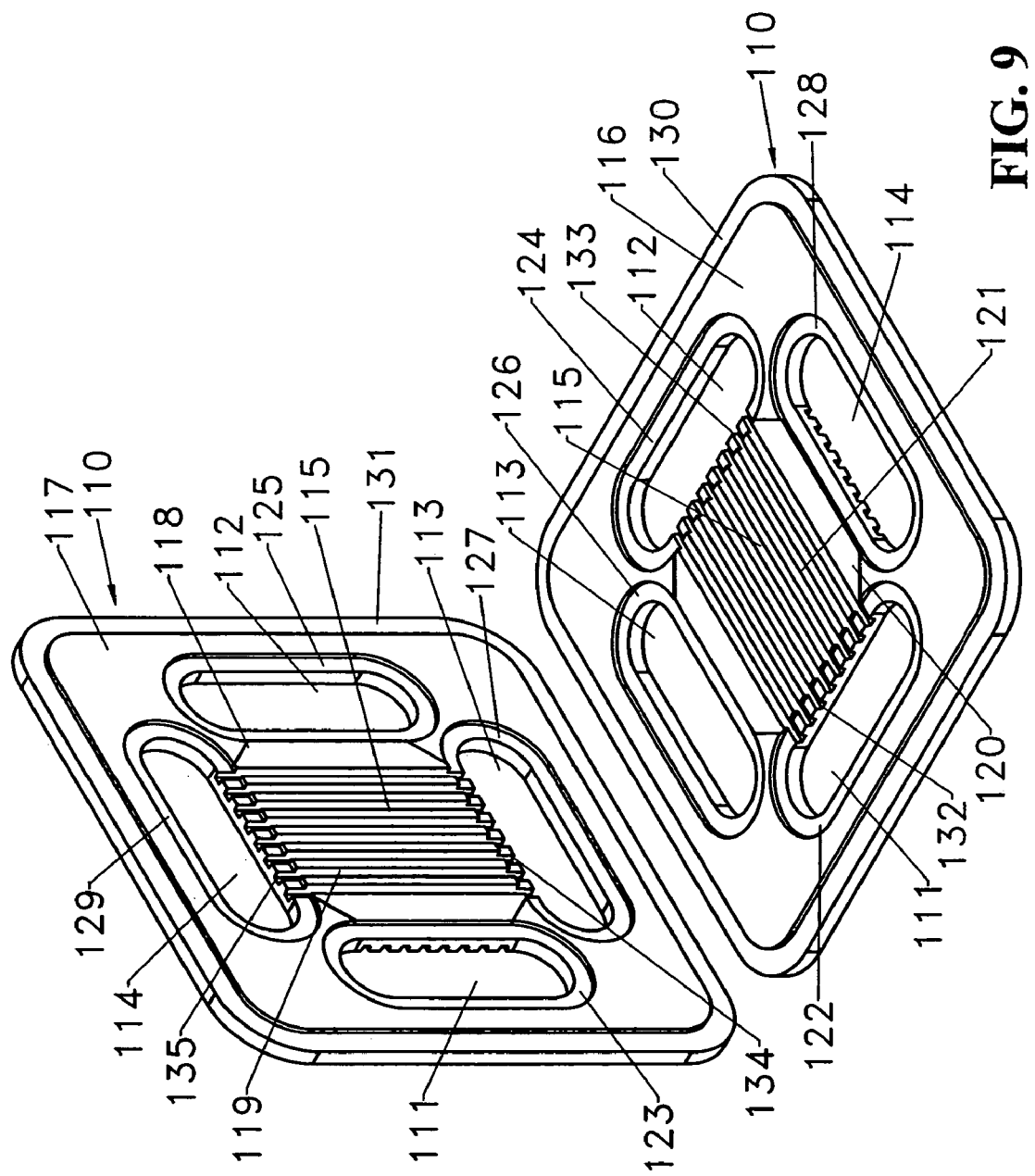
FIG. 9 is a perspective view showing two sides of the structural core of a cathode-supported planar SOFC electrochemical cell according to an alternative embodiment of the present invention.

FIG. 9 illustrates two sides of a structural core 110 of a cathode-supported cross-flow internal manifold configuration planar SOFC electrochemical cell, according to an alternative embodiment of the present invention. The structural core 110 preferably is made of porous cathode material, e.g., LSM. The core 110 is penetrated by a fuel-in aperture 111, a fuel-out aperture 112, an oxidant-in aperture 113, and an oxidant-out aperture 114 disposed around a central active area 115. The core 110 includes a fuel-contacting side 116 that develops a negative electrical potential, and an oxidant-contacting side 117 that develops a positive electrical potential. The core 110 incorporates a raised plateau 118 on the oxidant-contacting side 117 of the central active area 115. The oxidant-contacting side incorporates oxidant gas flow grooves 119 that extend across the central active area 115 such that the grooves 119 are distributed over the central active area 115.

The structural core 110 also incorporates a recess 120 on the fuel-contacting side 116 of the central active area 115. The fuel-contacting side 116 incorporates fuel gas flow grooves 121 that extend across the central active area 115 such that the grooves 121 preferably are distributed over the central active area 115. Seal seats 122 and 123 surround the fuel-in aperture 111 on the fuel-contacting side 116 and the oxidant-contacting side 117, respectively. Likewise, seal seats 124 and 125 surround fuel-out aperture 112; seal seats 126 and 127 surround the oxidant-in aperture 113; and seal seats 128 and 129 surround the oxidant-out aperture 114. Seal seats 130 and 131 parallel the perimeter of the core 1 on the fuel-contacting side 116 and the oxidant-contacting side 117, respectively. Fuel feed grooves 132 cross the seal seat 122 and connect the fuel gas flow grooves 121 to the fuel-in aperture 111. Similarly, the fuel exit grooves 133 cross the seal seat 124 and connect the fuel gas flow grooves 121 to the fuel-out aperture 112. Moreover, oxidant feed grooves 134 cross the seal seat 127 and connect the oxidant gas flow grooves 119 to the oxidant-in aperture 113; and the oxidant exit grooves 135 cross the seal seat 129 and connect the oxidant gas flow grooves 119 to the oxidant-out aperture 114.

Figure 10:
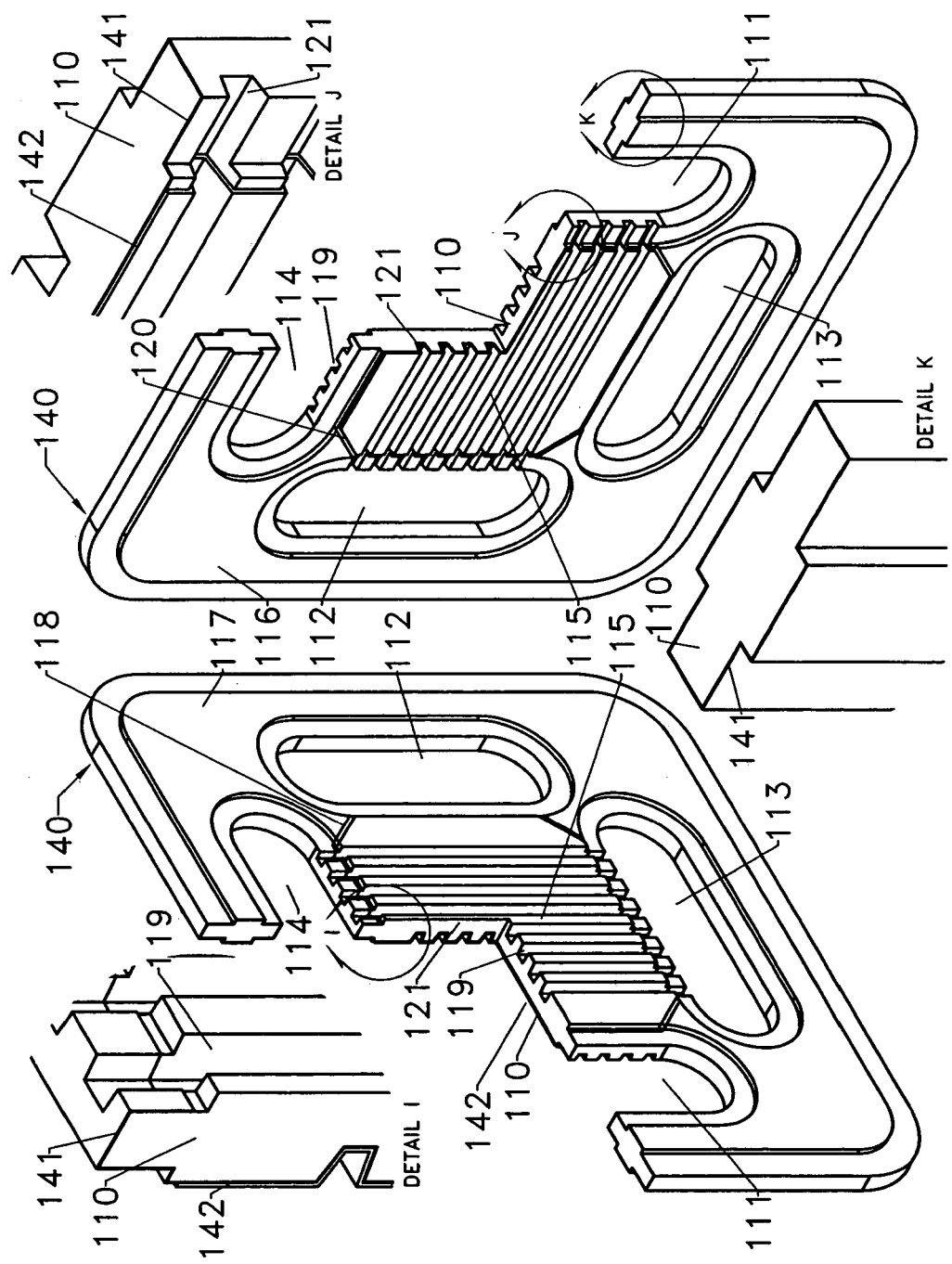
FIG. 10 is an enlarged perspective view of the electrochemical cell of FIG. 9.

A cathode-supported electrochemical cell 140 according to the present invention is formed by applying one or more coatings to the structural core 110, as illustrated in FIG. 10. A thin, dense YSZ electrolyte film 141 is applied to substantially all surfaces of the structural core 110, except the top surface of the raised plateau 118 on the oxidant-contacting side 117. Dimensions of the YSZ electrolyte film 141 can be set such that raised plateau rises above the surrounding electrolyte film. A porous cermet anode layer 142 is then applied over the YSZ electrolyte film 141 within the recess 120 on the fuel-contacting side 116. Dimensions of the YSZ electrolyte film 141 can be set such that the anode layer 142 is substantially coplanar with the surrounding electrolyte film. The anode layer 142 and the underlying electrolyte film 141 follow the contours of the fuel gas flow grooves 121, thereby increasing the effective power generation area in the electrochemical cell 140 to about 1.5 to 2 times the central active area 115.

Cathode-supported electrochemical cells 140 are assembled with bipolar separators 30 and end plates 70 and 83 to form bipolar cell stacks 100 in generally the same manner as the anode-supported electrochemical cells 27, such stacks being exemplified by FIGS. 3 to 8 and the accompanying description.

Figure 11:
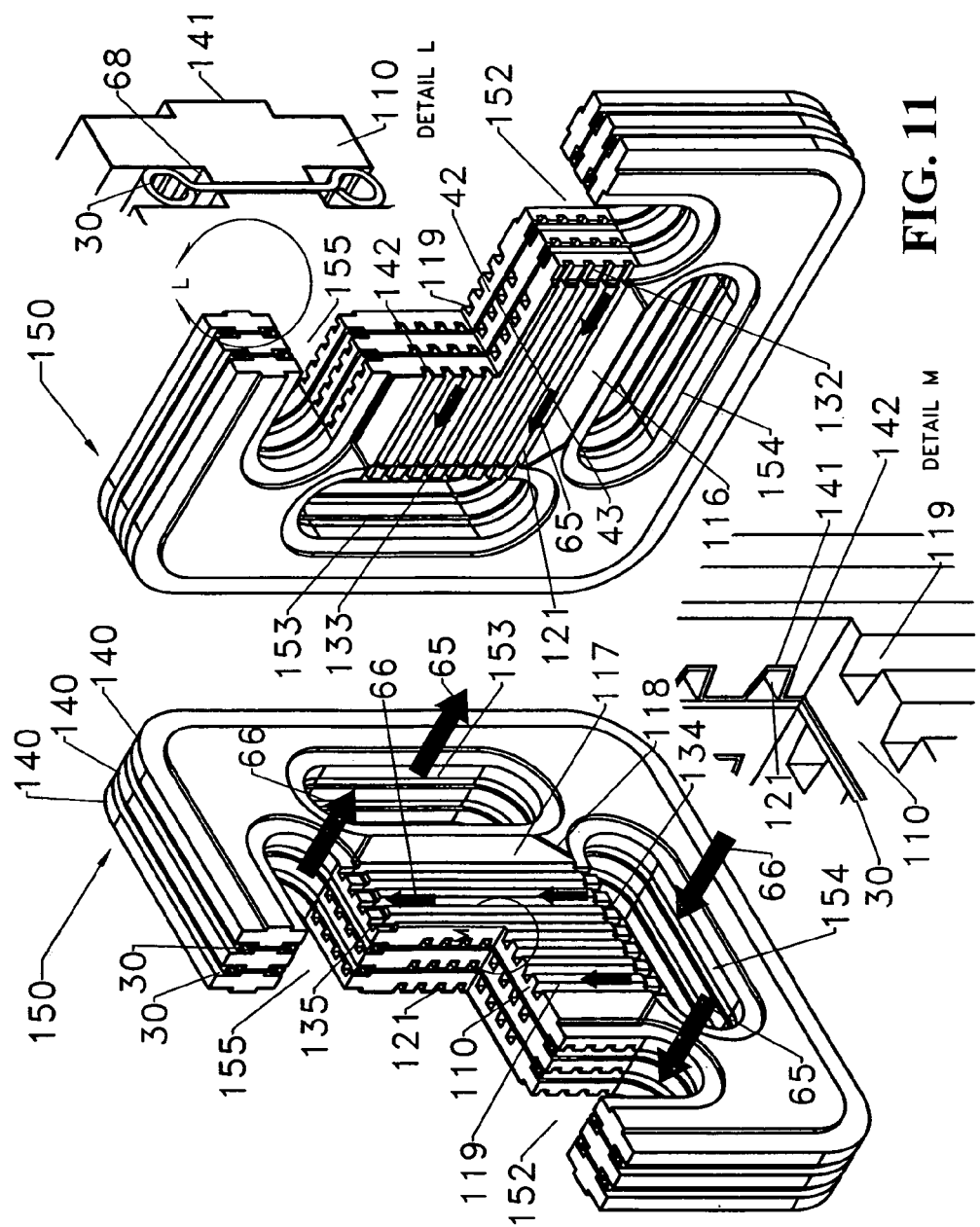
FIG. 11 is a perspective view of cathode-supported bipolar cell assemblies according to the present invention.

FIG. 11 illustrates the construction and function of cathode-supported bipolar cell assemblies 150, according to the alternative embodiment of the present invention, as also shown in FIGS. 9 and 10. A plurality of cathode-supported electrochemical cells 140 are alternately stacked with bipolar separators 30 such that the fuel-contacting sides 116 of the electrochemical cells 140 face the fuel-contacting faces 42 of the bipolar separators 30. Similarly, the oxidant-contacting sides 117 of the electrochemical cells 140 face the oxidant-contacting faces 43 of the bipolar separators 30. An axial clamping load applied perpendicular to the cell plane can press the electrochemical cells 140 and the bipolar separators 30 together such that the raised cathode plateaus 118 of the cells, the bipolar separators 30, and the anode layers 142 are in mechanical and electrical contact.

The bipolar cell assemblies 150 develop a voltage at the end cells equal to the sum of the voltages of each electrochemical cell 140. The fuel-contacting side 116 of one end cell is the negative terminal, and the oxidant-contacting side 117 of the opposite end is the positive terminal. The bipolar separator apertures align with the manifold apertures to form a fuel-in manifold 152, a fuel-out manifold 153, an oxidant-in manifold 154, and an oxidant-out manifold 155.

The fuel-in manifold 152 supplies fuel gas flow 65 (indicated by arrows) through the fuel feed grooves 132 to the fuel flow grooves 121 in the fuel-contacting sides 116 of the cells, thereby distributing fuel gas over the anode layer 142 where it reacts with oxidant ions transferred through the electrolyte film 141 to generate electric current. Similarly, the oxidant-in manifold 154 supplies oxidant gas flow 66 through the oxidant feed grooves 134 to the oxidant flow grooves 119 in the oxidant-contacting sides 117 of the cells, thereby distributing the required oxidant gas over the cathode 110. Spent fuel gas flows from the fuel flow grooves 121 through the fuel exit grooves 133 and into the fuel-out manifold 153. Spent oxidant flows from the oxidant flow grooves 119 through the oxidant exit grooves 135 and into the oxidant-out manifold 155.

The invention may be implemented in various forms. It is adapted to internal manifold layouts and gas flow groove configurations in which the fuel and oxidant gases are in cross-flow, parallel-flow, or mixed-flow. The invention also can be adapted to stacks that utilize multiple fuel-in, fuel-out, oxidant-in, and oxidant-out internal manifolds, as well as multistage stacks with gas transfer manifolds connecting a first group of cells to a second group of cells. The bipolar separators 30 may be formed from a variety of materials and material combinations including pure metals, alloys, cermets, and layered or coated sheets. Ductile coatings may be applied to the sheet stock prior to forming the seals, while brittle coatings may be applied afterwards.

The foregoing embodiments of the present invention have been presented for the purposes of illustration and description. These descriptions and embodiments are not intended to be exhaustive or to limit the invention to the precise form disclosed, and obviously many modifications and variations are possible in the light of the above disclosure. The embodiments were chosen and described in order to best explain the principle of the invention and its practical applications to thereby enable others skilled in the art to best utilize the invention in its various embodiment and with various modifications as are suited to the particular use contemplated. It intended that the invention be defined by the following claims.

What is claimed is:

1. A fuel cell stack including two or more planar electrochemical fuel cells with metallic bipolar separators disposed between the anode face of one electrochemical fuel cell and the cathode face of an adjacent electrochemical fuel cell, each of the planar electrochemical fuel cells comprising:
   a structural core formed of a first porous electrode material having at least one active power producing area and at least one inactive area;
   a plurality of fuel gas flow grooves crossing the active power-producing areas on one side of the core;
   a plurality of oxidant gas flow grooves arranged on the other side of the core;
   a dense electrolyte layer covering the active power producing areas on one side of the core;
   a layer formed of a second porous electrode material covering the dense electrolyte layer; and
   a dense electronic insulator layer covering the structural core except in the active power-producing areas;
wherein each of the metallic bipolar separators comprises:
   a metallic plate having a first fuel gas contacting surface and a second oxidant gas contacting surface;
   an outer edge and inner edges surrounding interior openings through the metallic plate; and
   at least a portion of each of the outer edge and inner edges curled to form a tubular bead with a lumen and a seam parallel to an axis of the tubular bead.

2. The fuel cell stack of claim 1, wherein the first porous electrode material forming the structural core of the electrochemical cell is anode material and the second porous electrode material covering the dense electrolyte layer is cathode material, and wherein fuel gas contacts the anode surface and oxidant gas contacts the cathode surface.

3. The fuel cell stack of claim 1, wherein the first porous electrode material forming the structural core of the electrochemical cell is cathode material and the second porous electrode material covering the dense electrolyte layer is anode material, and wherein fuel gas contacts the anode surface and oxidant gas contacts the cathode surface.

4. The fuel cell stack of claim 1, wherein the dense electronic insulator layer covering the structural core of the electrochemical cell is a continuous extension of the electrolyte layer in the active power-producing areas.

5. The fuel cell stack of claim 1, wherein the bipolar separators form electrically conductive paths between the anode of one electrochemical cell and the cathode of the next electrochemical cell, such that the cathode forming one end of the stack has a positive voltage relative to the anode forming the other end of the stack, and the voltage measured at the one end of the stack is equal to the sum of voltages of each electrochemical cell in the stack.

6. The fuel cell stack of claim 1, wherein smooth perimeter sealing surfaces are formed in the inactive area surrounding the active areas on the fuel side and the oxidant side of each electrochemical fuel cell.

7. The fuel cell stack of claim 6, wherein the metallic bipolar separators incorporate tubular beads that align with the perimeter sealing surfaces of the electrochemical fuel cells and are compressed between opposing perimeter sealing surfaces of the adjacent cells.

8. The fuel cell stack of claim 1, wherein at least one fuel gas manifold opening or oxidant gas manifold opening passes through the electrochemical cell inactive areas, and smooth manifold sealing surfaces surround each manifold opening on the fuel side and the oxidant side of the core.

9. The fuel cell stack of claim 8, wherein the metallic bipolar separators incorporate interior openings surrounded by tubular beads that register with the at least one fuel gas manifold opening or oxidant gas manifold opening;
   the tubular beads align with the manifold sealing surfaces in the electrochemical fuel cells; and
   the tubular beads are compressed between opposing sealing surfaces of adjacent cells.

10. The fuel cell stack of claim 9, wherein at least one fuel gas feed or exhaust groove crosses each smooth fuel gas manifold sealing surface on the fuel side of each electrochemical cell and connects with at least one fuel gas flow groove in the active power-producing area.

11. The fuel cell stack of claim 10, wherein the metallic bipolar separator tubular beads bridge fuel gas feed and exhaust grooves crossing fuel gas sealing surfaces in one cell, while maintaining compressive sealing pressure against the opposing oxidant gas sealing surfaces of the adjacent cell.

12. The fuel cell stack of claim 9, wherein at least one oxidant gas feed or exhaust groove crosses each smooth oxidant manifold sealing surface on the oxidant side of each electrochemical cell and connects with at least one oxidant gas flow groove in the active power-producing area.

13. The fuel cell stack of claim 12, wherein the metallic bipolar separator tubular beads bridge oxidant gas feed and exhaust grooves crossing oxidant gas sealing surfaces in one cell, while maintaining compressive sealing pressure against the opposing fuel gas sealing surfaces of the adjacent cell.

14. The fuel cell stack of claim 1, wherein the tubular bead lumens of the metallic bipolar separators are at least partially filled with material to modify the mechanical properties of the tubular beads, wherein the material is selected from one or more of wire, braze metal, refractory powder, and refractory fiber.

15. The fuel cell stack of claim 1, wherein the tubular bead seams of the metallic bipolar separators are closed by welding, brazing, or glass sealing.

16. The fuel cell stack of claim 1, wherein the metallic bipolar separator tubular beads are oriented such that the seams are contacted only by fuel gas.

17. The fuel cell stack of claim 1, wherein the metallic bipolar separator tubular beads are oriented such that the seams are contacted only by oxidant gas.

18. The fuel cell stack of claim 1, wherein positive and negative metallic endplates are assembled to the cathode and anode ends of the stack, respectively.

19. The fuel cell stack of claim 18, wherein:
   the stack is terminated by a first metallic bipolar separator added between the positive metallic endplate and the cathode end of the stack, and a second metallic bipolar separator added between the negative metallic endplate and the negative end of the stack;
   the added metallic bipolar separators form electrically conductive paths between the stack ends and the metallic endplates such that the endplates become fuel cell power connection terminals;
   the metallic endplates incorporate smooth perimeter sealing surfaces that oppose the smooth perimeter seals on the adjacent electrochemical fuel cells;
   at least one of the metallic endplates incorporates apertures that register with the bipolar separator and electrochemical fuel cell manifold openings, and include smooth manifold sealing surfaces that oppose the smooth manifold sealing surfaces on the adjacent electrochemical fuel cells; and the tubular beads of the added metallic bipolar separators are compressed between opposing sealing surfaces of the adjacent electrochemical fuel cells and the end plates.

20. The fuel cell stack of claim 19, wherein at least one bleed passage supplies fuel gas to the interface between the first added metallic bipolar separator and the positive metallic endplate.

21. The fuel cell stack of claim 19, wherein at least one bleed passage supplies fuel gas to the interface between the second added metallic bipolar separator and the positive metallic endplate.

22. The fuel cell stack of claim 19, wherein a clamping force perpendicular to the plane of the cells is applied to the end plates, the clamping force being sufficient to compress the tubular beads of the metallic bipolar separators and provide electrical contact between the electrochemical cells, metallic bipolar separators, and metallic endplates.

23. A metallic bipolar separator, comprising
a metallic plate having a first fuel gas contacting surface and a second oxidant gas contacting surface;
the metallic plate having an outer edge and inner edges surrounding interior openings through the plate; and
at least a portion of each of the outer edge and inner edges curled to form a tubular bead with a lumen and a seam parallel to an axis of the tubular bead.

24. The metallic bipolar separator of claim 23, wherein the tubular beads are compressed between opposing sealing surfaces of adjacent electrochemical fuel cells or end plates such that the beads conform to the mating surfaces and effect a seal.

25. The metallic bipolar separator of claim 23, wherein the tubular bead lumens are at least partially filled with material to modify the mechanical properties of the tubular beads, wherein the material is selected from one or more of wire, braze metal, refractory powder, and refractory fiber.

26. The metallic bipolar separator of claim 23, wherein the tubular bead seams are closed by welding, brazing, or glass sealing.

27. The metallic bipolar separator of claim 23, wherein the tubular beads are oriented such that the seams are contacted only by fuel gas.

28. The metallic bipolar separator of claim 23, wherein the tubular beads are oriented such that the seams are contacted only by oxidant gas.

* * * * *